(12) United States Patent
Clark et al.

(10) Patent No.: US 6,876,449 B2
(45) Date of Patent: Apr. 5, 2005

(54) ADJUSTABLE MIRROR ASSEMBLY FOR POLARIZATION DEPENDENT LOSS COMPENSATION

(75) Inventors: Stephan R. Clark, Windsor, CA (US); Lucas M. Fernandez, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 385 days.

(21) Appl. No.: 10/256,919

(22) Filed: Sep. 27, 2002

(65) Prior Publication Data

US 2004/0061856 A1 Apr. 1, 2004

(51) Int. Cl.[7] .................................................. G01J 3/18
(52) U.S. Cl. ...................................... 356/334; 356/328
(58) Field of Search ................................. 356/305, 328, 356/326, 333, 334

(56) References Cited

U.S. PATENT DOCUMENTS

2002/0196496 A1 * 12/2002 Silveira et al. ............. 359/128

OTHER PUBLICATIONS

"Agilent 8614xB Optical Spectrum Analyzer Family Technical Specifications," Agilent Technologies, Inc., pp. 1–11, (Feb. 8, 2002).

* cited by examiner

Primary Examiner—F. L. Evans

(57) ABSTRACT

An optical beam having a randomly and unpredictably variable input polarization state propagates through an optical system containing a first optical surface, for example a diffraction grating, a first adjustable mirror, and means for rotating the respective parallel (P) and perpendicular (S) plane polarization components of the optical beam relative to the first optical surface by ninety degrees, thereby generating a polarization rotated optical beam having reversed orientations of the S and P polarization components relative to the input. The optical beam is reflected from the first adjustable mirror, which redirects the optical beam onto an optimized location on the first optical surface, thereby reducing PDL due to propagation through the optical system. In some embodiments the optical beam location on the first adjustable mirror remains substantially constant during adjustment.

22 Claims, 4 Drawing Sheets

ADJUSTABLE MIRROR ASSEMBLY FOR POLARIZATION DEPENDENT LOSS COMPENSATION

TECHNICAL FIELD

The present invention relates to polarization dependent loss compensation, and particularly to an adjustable mirror assembly for polarization dependent loss compensation in an optical instrument.

BACKGROUND OF THE INVENTION

Polarization dependent loss (PDL), in which optical power transmitted along a propagation path changes as a function of polarization state of the light beam, is a well-known phenomenon in optical systems and instruments, for example optical spectrum analyzers. The maximum difference in power over all possible polarization states is termed polarization dependent loss (PDL). Because changes in polarization state of an input beam occur at an unpredictable time and rate, the optical spectrum analyzer (OSA) or other instrument preferably uses some type of static PDL correction that is not dependent on time or the exact state of polarization of the light that enters the system.

FIG. 1 illustrates schematically a current Agilent Technologies 8614x series OSA instrument (see Agilent Technologies data sheet 8614xB Optical Spectrum Analyzer Family Technical Specifications). This instrument incorporates a monochromator 10 having diffraction grating 17 as a dispersive element. An input beam 12a typically entering through input fiber 11 is directed by first mirror 13a and second mirror 13b through collimating element 16 along two passes 12a and 12c onto diffraction grating 17. Between the two passes, the beam is directed through a resolution defining aperture that is normally incorporated into slit wheel 14 to provide a range of aperture sizes. Collimating element 16, typically a lens, refocuses diffracted light from the surface of grating 17 in each pass 12b and 12d back onto the optical plane of slit wheel 14. Output beam 12e is deflected by output mirror 13c into output fiber 18.

The current method used to reduce PDL induced changes in power measured by the OSA as the input light source polarization state changes is to rotate the state of polarization of the input beam through monochromator 10 by 90 degrees between the first pass and the second pass. In the current instrument, this is implemented by inserting half-wave plate 15 in second pass 12c immediately after reflection from second mirror 13b. This balancing technique effectively rotates the S and P states of polarization, which by definition are orthogonal, and reverses their state between first pass 12a, 12b and second pass 12c, 12d through the optical system. Any arbitrary state of polarization can be made up of a superposition of the orthogonal S and P states. For example, if the input beam state were S, after traveling through the first pass of the instrument it would be rotated to the orthogonal state P, and vice versa. Rotating the states so that both orthogonal states exist in the double-pass system regardless of the input state means that the output power of the OSA ideally does not change, even though the input polarization state changes. For this technique to work most effectively, the net reflectance for S polarization on first pass 12a, 12b multiplied by the net reflectance for P polarization on second pass 12c, 12d equals the net reflectance of P polarization on first pass 12a, 12b multiplied by the net reflectance for S polarization on second pass 12c, 12d. Orthogonal states S and P are used to analyze this system because they are additionally the worst case states for this system.

To determine the power that is transmitted through the optical spectrum analyzer for the two worst case polarization states the following relation may be used.

$$\text{Power out} = \text{Power In} * T_i \text{input fiber} * R_i \text{grating} * R_i \text{mirror1} * R_i \text{mirror2} * R_{i'} \text{grating} * R_{i'} \text{mirror3} * T_{i'} \text{output\_fiber}$$

In this expression, R and T represent respective reflection and transmission percentages, subscript i represents the polarization state, e.g., S or P, at the specified surface, and subscript i' represents the rotated polarization state as the beam propagates from the first pass to the second. Because each surface has a different orientation, what would be considered S for one surface could be P for another, so to remove any misunderstanding, the rule applied in the following discussion is that the input polarization state is identified relative to the grating surface. Referring to the coordinate axes in FIG. 1, the grating dispersion direction and the P polarization direction are parallel to the y-axis, which is perpendicular to the plane of the figure, whereas the non-dispersion direction and the S polarization direction are parallel to the x-axis, pointing upward parallel to the plane of the figure. Both polarizations are mutually perpendicular to the z-axis, which is essentially parallel to the dominant propagation direction of light beam passes 12a, 12b, 12c, and 12d. Because any polarization state or unpolarized state of the field can be represented as a superposition of the orthogonal basis set of S and P, which also happen to be the worst case polarization states, only these two electric field states are required to define the worst case polarization dependent loss. The following example uses common reflectance values and an input power of one milliwatt.

P input state (P relative to Grating)

= 1.0 mW*0.964*0.5*0.986*0.986    *    0.8*0.992*0.95
first pass    second pass
= 0.4686    *    0.754
= 0.353 mW S input state (S relative to Grating)

= 1.0 mW*0.966*0.8*0.992*0.992    *    0.49*0.986*0.94
first pass    second pass
= 0.7604    *    0.454
= 0.345 mW This example shows that for the first pass with a P input state the net output power is 0.4686 mW. For the second pass with an S input state, which is actually P relative to the grating having had the polarization rotated by half-waveplate 15, the net power is 0.454 mW. This shows that the net effects of the two halves of the optical spectrum analyzer are closely but not perfectly balanced. If the first pass with an S input state were compared to the second pass with a P input state, the same result occurs. If these passes are multiplied together, both input states will result in roughly the same power through the optical spectrum analyzer at approximately 0.35 mW. The transmitted powers are not exactly the same for the two different polarization states. In this example, the net system PDL is defined by the relation, PDL=10*LOG(Power for P input state/Power for S input state), which in this example evaluates to slightly less than 0.1 dB polarization dependent loss. If great care is not taken in the selection of the optical system components this value for PDL can be as large as 1 dB.

These differences are important, because the input polarization changes continually and unpredictably with time, due for example to fluctuations in optical source and/or fiber polarization states. These can produce instrument output power fluctuations that may be incorrectly attributed, for example, to source power fluctuations, but in reality may be artifacts produced by instrument PDL. It would therefore be advantageous for an optical system or instrument to be substantially immune to performance changes arising from input polarization fluctuations.

BRIEF SUMMARY OF THE INVENTION

The present invention is directed to a system and a method for compensating polarization dependent loss (PDL) due to propagation through an optical system of an optical beam having a randomly and unpredictably variable input polarization state. The optical system contains a first optical surface, for example a diffraction grating, a first adjustable mirror, and a polarization shifter for interchanging the respective parallel (P) and perpendicular (S) polarization axes of the optical beam relative to the first optical surface, thereby generating a polarization interchanged optical beam having reversed orientations of the S and P polarization components relative to the input. The optical beam is reflected from the first adjustable mirror, which reoptimizes by redirecting the optical beam location on the first optical surface from first pass to second pass, thereby reducing PDL due to propagation through the optical system. In this regard the first optical surface may be considered a variable PDL component. In some embodiments the location of the optical beam relative to the first adjustable mirror remains substantially constant.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
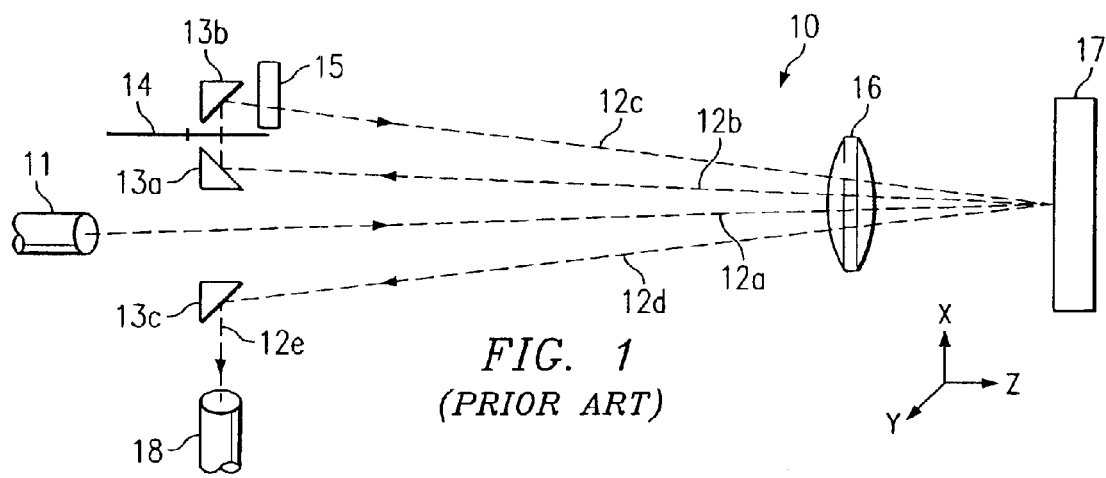
FIG. 1 illustrates schematically a current Agilent Technologies 8614x series Optical Spectrum Analyzer (OSA) instrument.

Certain system properties facilitate the polarization rotation scheme described in connection with FIG. 1. One such property is that the first pass 12a, 12b of the system physically have the same effective total component reflectance ratio of S/P polarizations as the second pass 12c, 12d. Individual component reflectance values may vary from first pass to second pass, but their aggregate value as used in the ratio is the same. One way of implementing this method is to make the net component reflectance values from the first pass for S and P polarizations respectively the same as in the second pass. Embedded in this property is the desirability of component spatial uniformity. Any optical beam traveling through the OSA will have some spatial extent over which the optical power is distributed. The term spatial extent means the length and width or physical area of the optical component surface where the light is incident. The term spatial uniformity means that the optical component will have the same optical properties over the entire spatial extent.

Figure 2:
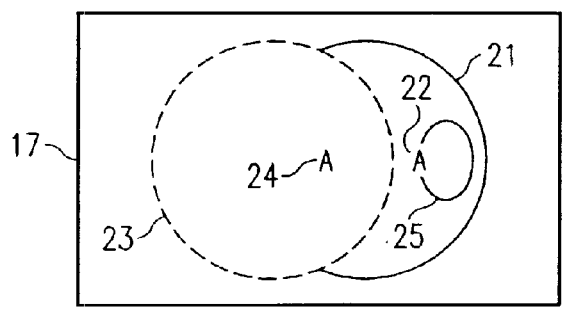
FIG. 2 illustrates schematically as an example the surface of a diffraction grating illuminated over a first spatial extent by first pass beam and over an offset spatial extent by a second pass beam.

Because of spatial variations in the grating reflectance and in the input light beam power distribution, the net PDL value for any OSA system is considered a weighted sum of the products of local power concentrations and local reflectance of each infinitesimal area of the spatial extent of a reflective component illuminated by a light beam. The net transmitted power is found by multiplying the local power concentration by the local reflectance associated with that location in the beam cross-section and then summing all of those contributions over the full spatial extent of the beam. FIG. 2 illustrates schematically as an example the surface of diffraction grating 17 illuminated over spatial extent 21 by first pass beam 12a and over offset spatial extent 23 by second pass beam 12c. For example, point A, 22, within spatial extent 21 of first pass beam 12a lies in a region of local variation 25 of the grating reflectance. As second pass beam 12c returns to grating 17, corresponding point A, 24 within spatial extent 23 of beam 12c will not necessarily contact grating 17 in the same region of local reflectance variation 25. This means that an S state beam at the grating for the first pass will encounter a local variation 25 that a second pass rotated P state will not necessarily encounter, and consequently the sum of the products of local power concentrations multiplied by the local reflectance values results in different values for first pass 12a relative to second pass 12c. This typically leaves some portion of polarization dependent loss unbalanced. In this regard grating 17 can be considered a variable PDL component.

With the current polarization interchange technique, the optical component reflectance values are optimally uniform over their spatial extent for the PDL of that component to cancel the first pass with the second pass over that component or else fortuitously vary by the appropriate amount relative to some other component that is also nonuniform to make the weighted sum of the PDL balance to a minimum.

Because spatial uniformity as well as the individual reflectance values of each optical component are difficult to control, there is almost always some unbalanced residual PDL.

Figure 3:
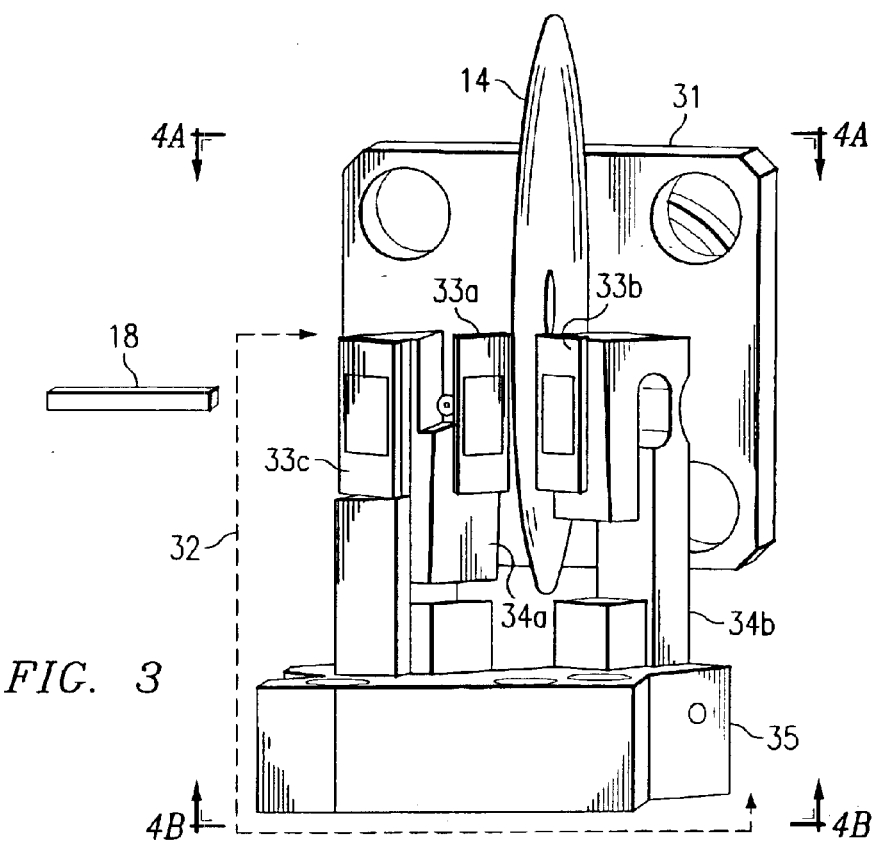
FIG. 3 is a perspective view illustrating a mirror assembly embodiment that makes PDL adjustment possible.

In accordance with embodiments of the present invention, spatial non-uniformity of grating 17 used in the 8614x series OSA is nominally compensated by rotating the orientation of second mirror 13b, in both the dispersion and non-dispersion directions, such that the beam path for second pass 12c through monochromator 10 is redirected to superimpose spatial extent 23 of second pass 12c substantially onto spatial extent 21 of first pass 12a at the surface of grating 17. If residual PDL is found, then spatial extent 23 of the second pass is adjusted away from this substantial superposition to obtain a better matching condition for the system PDL. Moving the second pass spatial extent relative to the first pass changes the distribution of the reflected beam off grating 17 of second pass 12c relative to first pass 12a, consequently altering the aggregate PDL value for the system. This change in reflectance is due to the nonuniformities found in the grating either by design or by typical manufacturing tolerances. FIG. 3 is a perspective view illustrating a mirror assembly embodiment that implements this adjustment.

Mirror assembly 32 depicted in FIG. 3 allows first mirror 33a and second mirror 33b each to be independently adjusted in the dispersion as well as the non-dispersion plane, using a set of four right-circular flexures whose axes are oriented nominally orthogonal to the planes of the dispersion and non-dispersion directions of the respective mirrors, as described in more detail below. First mirror 33a is supported by first flexure mirror mount 34a, and second mirror 33b is similarly supported by second flexure mirror mount 34b. In the present embodiment, first mirror 33a and second mirror 33b are oriented approximately at right angles with one another on opposite sides of slit wheel 14. First flexure mirror mount 34a and second flexure mirror mount 34b are each attached through a flexure mechanism to base 35. Although two-axis angular adjustment of second mirror 33b is sufficient to practice the technique of the present invention, the present embodiment for convenience depicts a similar adjustment mechanism for first mirror 33a, which is useful for making certain optical system alignments that are unrelated to PDL compensation. Output mirror 33c deflecting the output beam into output fiber 18 and input fiber holder 31 positioning input fiber 11 are likewise shown for clarity in FIG. 3 but are unrelated to the present PDL compensation technique.

Figure 4A:
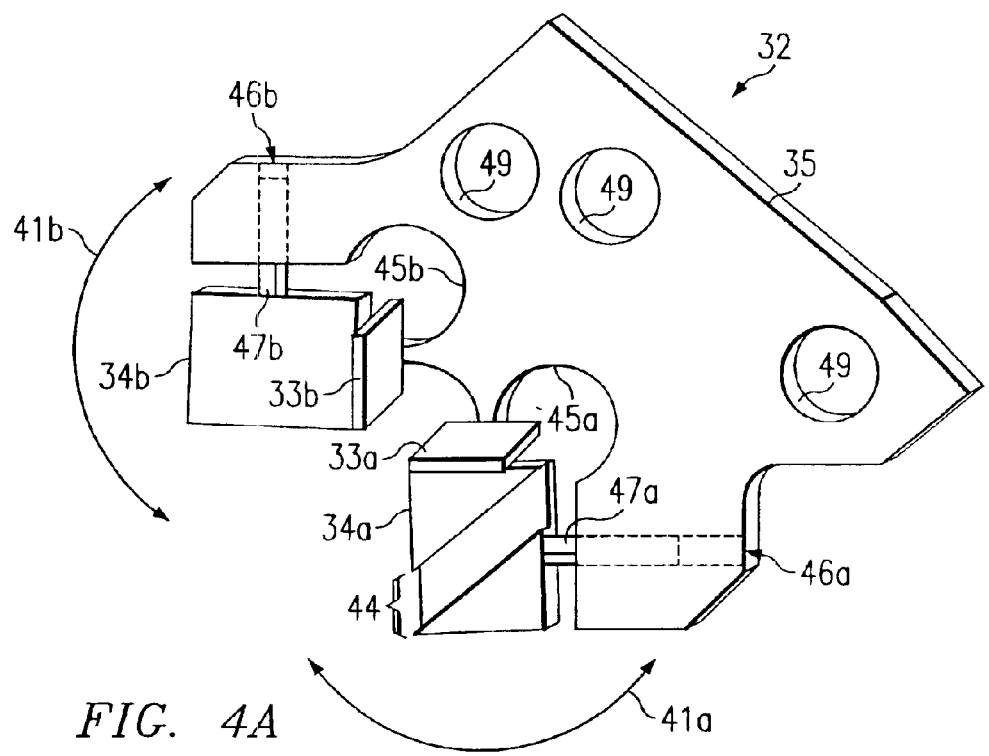
FIGS. 4A and 4B illustrate the mirror assembly of FIG. 3 in accordance with the present embodiment, viewed respectively from the top and from the bottom.
Figure 4B:
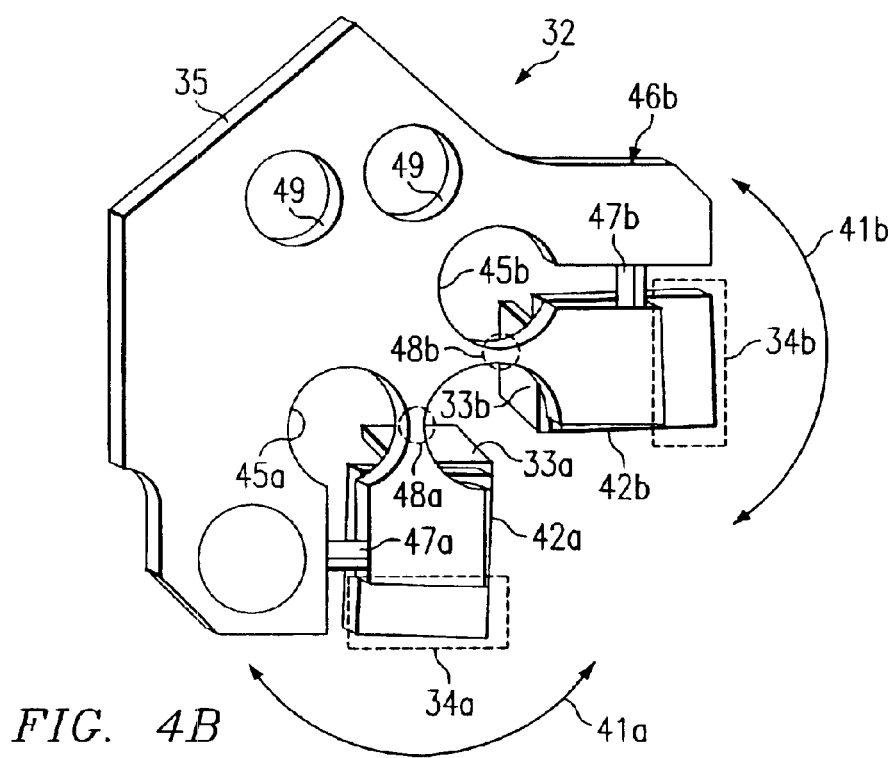
Figure 5A:
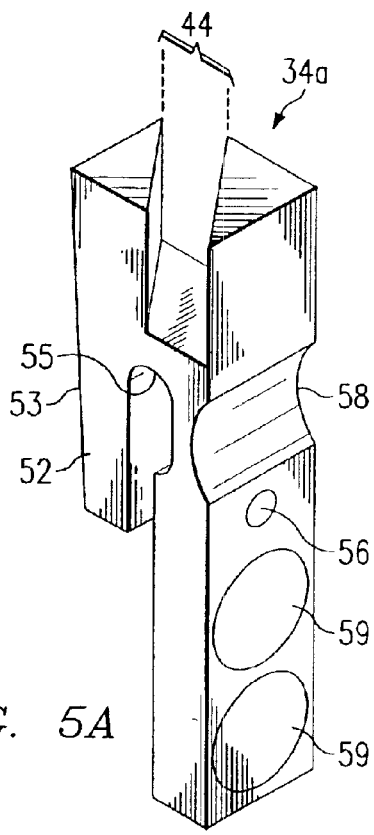
FIGS. 5A–5B and FIGS. 6A–6B are component details illustrating respective first and second flexure mirror mounts.
Figure 5B:
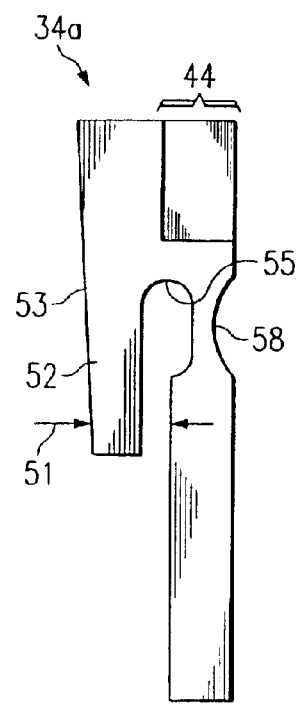

FIGS. 4A and 4B illustrate mirror assembly 32 in accordance with the present embodiment, viewed from the top in direction 4A—4A and from the bottom in direction 4B—4B respectively in FIG. 3. First flexure mirror mount 34a supporting first mirror 33a is anchored to first movable mounting block 42a connected integrally to base 35 through first base flexure 45a, which has a thinned section first flexure rotation axis 48a. Likewise, second flexure mirror mount 34b supporting second mirror 33b is anchored to second movable mounting block 42b connected integrally to base 35 through second base flexure 45b, which has a thinned section second flexure rotation axis 48a. Set screws 47a, 47b preloaded in compression in respective threaded bores 46a, 46b actuate respective first and second movable mounting blocks 42a, 42b along respective angular arcs 41a, 41b about respective first and second flexure rotation axes 48a, 48b, thereby providing adjustment in the non-dispersion direction for respective first and second mirrors 33a, 33b. Through-bores 49 in base 35 provide precise alignment via locating pins with an instrument frame (not shown).

FIGS. 5A–5B and FIGS. 6A–6B are component details illustrating respective first and second flexure mirror mounts 34a and 34b. First mirror 33a attaches to surface 53 on movable member 52 of right circular flexure 55, integral with first flexure mirror mount 34a. A set screw (not shown) in threaded bore 56 bears against movable member 52, actuating movable member 52 along an angular arc about first flexure rotation axis 58, and thereby providing adjustment in the dispersion direction for first mirror 33a. First flexure mirror mount 34a includes through bores 59 (preferably counterbored) for attaching as a unit to first movable mounting block 42a of base 35. In the present embodiment, first movable mounting block 42a also contains slot 44, which advantageously provides optical path clearance for input beam 12a.

Figure 6A:
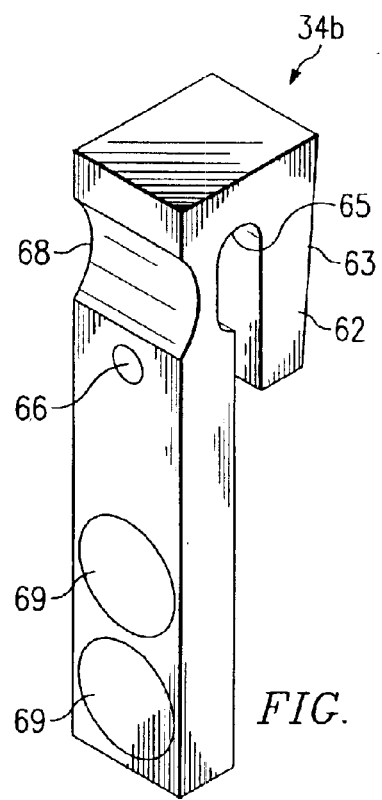
Figure 6B:
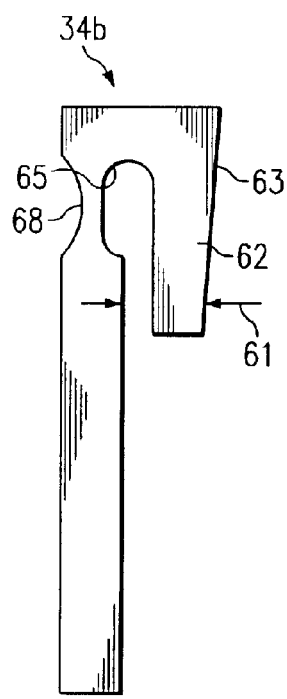

Similarly, in FIGS. 6A–6B second mirror 33b attaches to surface 63 on movable member 62 of right circular flexure 65, integral with second flexure mirror mount 34b. A set screw (not shown) in threaded bore 66 bears against movable member 62, actuating movable member 62 along an angular arc about second flexure rotation axis 68 and thereby providing adjustment in the dispersion direction for second mirror 33b. Second flexure mirror mount 34b includes through bores 69 (preferably counterbored) for attaching as a unit to second movable mounting block 42b of base 35. The mirror flexures are oriented for convenience to redirect the optical beam in two substantially orthogonal dispersion and non-dispersion directions. In an implementation of the embodiments, for example, the tolerances on orthogonality of the flexure axes are about +/−2 degrees. However, normally orthogonal means that some cross-coupling in the adjustment directions is allowed without compromising the functionality of the device, so long as the two axes of mirror adjustment permit the second pass beam to be redirected onto any given location on the grating.

Figure 7:
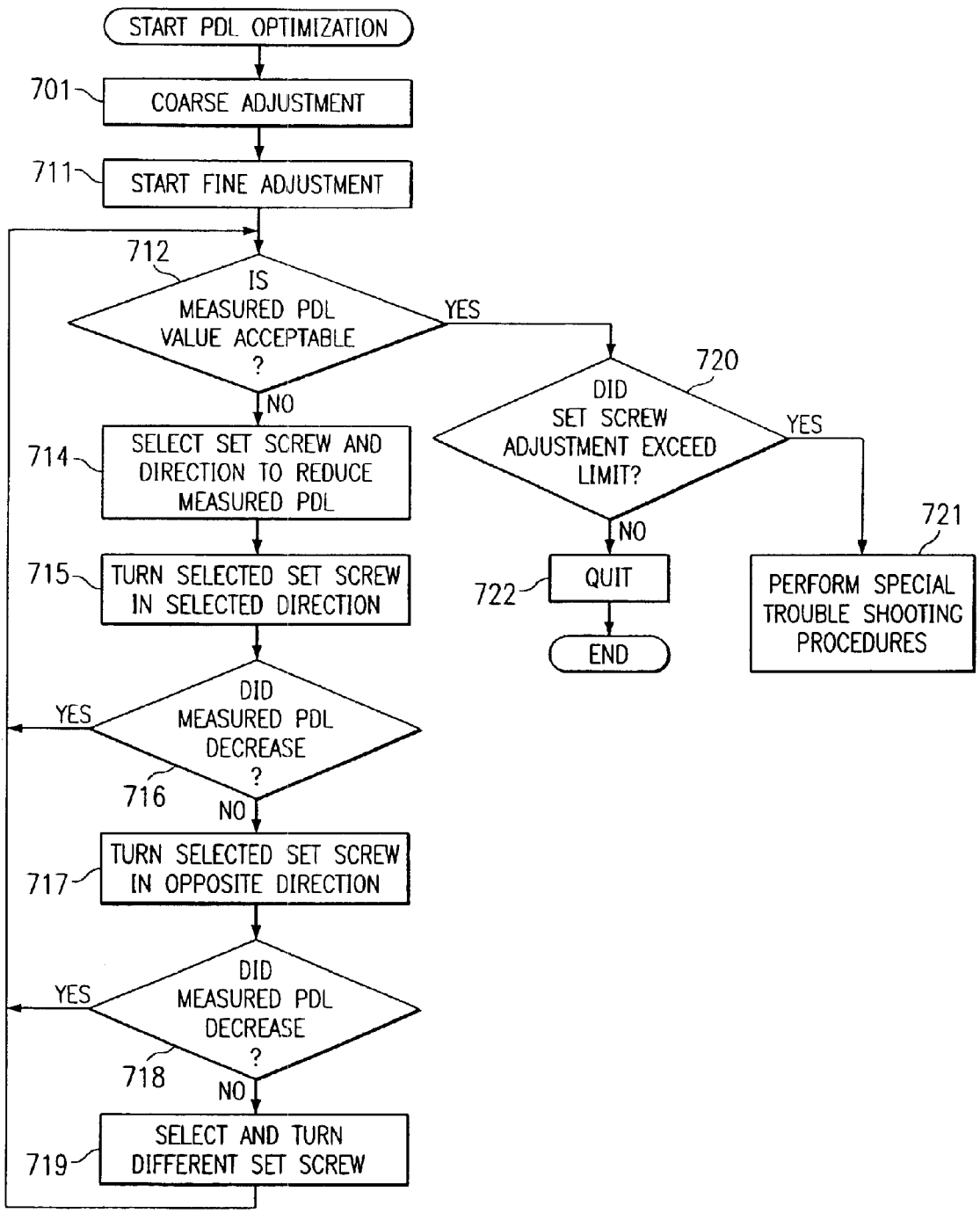
FIG. 7 depicts an optionally included adjustment procedure for PDL compensation, in accordance with embodiments of the present invention.

In accordance with embodiments of the present invention, first and second mirrors 13a and 13b are actuated to rotate in the non-dispersion and dispersion directions without appreciably changing the location of the optical beam 12b on the surface of either mirror. If the mirrors were to translate relative to the optical beam, there can be undesirable lateral shifts in the beam path and/or changes in the focal plane of the instrument. For large enough mirror translations, the beam location can actually walk off the mirror surface. In the embodiment depicted in FIGS. 3, 4A–4B, the axes of the right-circular flexures are disposed to minimize translation of the mirror surface in all three axes as it is rotated during PDL compensation adjustment, such that the mirrors experience pure rotation in the non-dispersion direction and substantially pure rotation in the dispersion direction as well. Set screws are pre-loaded such that they remain under compression throughout the entire usable adjustment range of the mirror assembly. This is accomplished, for example, by configuring wedge angles such as wedge angles 51 and 61 between the normal to mirror mounting surfaces 53, 63 and the corresponding axes of set screw threaded bores 46a, 46b, 56, 66 in both dispersion and non-dispersion directions, forcing the set screws into compression in order to rotate the respective mirror surfaces into a nominally normal orientation. Alternatively to the flexure and set screw configuration described in connection with FIGS. 3, 4A–4B, mirror actuation can be accomplished by other rotational drivers known to those skilled in the art, for example mechanical drives such as pin connections with springs and set screws, gear drives, electromechanical drives such as motors and piezoelectric actuators and hydraulic drives, all of which are considered to be within the scope of the present invention FIG. 7 depicts an optionally included mirror adjustment procedure for PDL compensation in an optical system, in accordance with embodiments of the present invention. Typically an adjustment procedure includes a coarse adjustment such as that depicted at step 701 using conventional techniques, typically involving an autocollimator, followed by a fine adjustment such as that starting at step 711. Preferably the fine adjustment procedure starts with second mirror 33b in the non-dispersion direction, employing real time measurement of PDL using conventional techniques as an indicator of the degree of successful mirror adjustment. At step 712 it is determined if the measured PDL value is acceptable. If so, then at step 720 it is determined if the set screw adjustment has exceeded its limit. If so, then special troubleshooting procedures outside the scope of the present invention are performed at step 721. If not, then at step 722 adjustment is terminated and the procedure ends. If measured PDL at step 712 is not acceptable, then at step 714 a tentative adjusting set screw (typically non-dispersion) and actuation direction are selected to reduce the measured PDL. These selections are then implemented at step 715, following which it is determined at step 716 if the PDL decreased at step 715. If so, then the procedure returns to step 712 for a next iteration. If not, then at step 717 the selected set screw is actuated slightly in the opposite direction, and at step 718 it is determined if the actuation of step 717 decreased the measured PDL. If so, then the adjustment procedure returns to step 712 for a next iteration. If not, then at step 719 a different set screw (typically dispersion direction) is selected and turned, following which the adjustment procedure returns to step 712 for a next iteration. In some embodiments, either coarse or fine adjustment can be omitted. Although the procedure depicted in FIG. 7 can readily be performed by an operator manually, it can also be performed automatically and algorithmically using optical sensor feedback under hardware, software, or firmware control. In addition, it will be recognized by those having skill in the art that variations of the procedure of FIG. 7 are considered to be within the scope of the present invention.

The PDL compensation technique in accordance with the present invention is useful for double pass or multiple pass systems where the light beam encounters some surfaces more than once. It would be most effective if the surface that is encountered more than once is also the dominant PDL contributing component in the system, such that its effect can be minimized. It is theoretically possible to use this technique, even if the light encounters the component only once. In that configuration, the grating and the adjustable mirror constitute essentially a variable PDL component used to try to compensate some other component in the system. This method would introduce spatial variation across the beam, which would need to be taken into account if implemented. It would also have a potentially limited PDL range dictated by the actual spatial non-uniformities for the S and P states on the component.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for compensating polarization dependent loss (PDL) applied to an input optical beam of an optical system, said method comprising:

receiving said input optical beam into said optical system containing a first optical surface and a first adjustable mirror;

interchanging the respective parallel (P) and perpendicular (S) plane polarization components of said input optical beam relative to said first optical surface, thereby generating a polarization interchanged optical beam having reversed orientations of said S and P polarization components relative to said input optical beam;

reflecting said input optical beam from said first adjustable mirror; and actuating the reflective orientation of said first adjustable mirror such that the location of said polarization interchanged optical beam is redirected on said first optical surface, thereby reducing PDL due to propagation through said optical system.

2. The method of claim 1 wherein said reflecting precedes said interchanging.

3. The method of claim 1 further comprising propagating said input optical beam through said optical system in a first pass prior to said interchanging and reflecting and then propagating said polarization interchanged optical beam through said optical system in a second pass.

4. The method of claim 3 wherein said redirected location on said first optical surface is determined relative to a location on said first optical surface intercepting said input optical beam in said first pass.

5. The method of claim 1 wherein said redirected location on said first optical surface is determined relative to a location on a second optical surface different from said first optical surface.

6. The method of claim 1 wherein said actuating is performed using a rotational drive selected from the group consisting of mechanical drives, flexures deformed using set screws, pin connections with springs and set screws, gear drives, electromechanical drives, motors, piezoelectric actuators, and hydraulic drives.

7. The method of claim 1 wherein said actuating is performed independently in two nominally orthogonal directions.

8. The method of claim 1 wherein said first optical surface is a surface of a diffraction grating having a dispersion direction and a non-dispersion direction substantially orthogonal to said dispersion direction.

9. The method of claim 8 wherein said actuating is performed substantially independently in said dispersion direction and in said non-dispersion direction.

10. The method of claim 1 wherein the location of said input optical beam on the surface of said first adjustable mirror remains substantially invariant during said actuating.

11. The method of claim 1 wherein said optical system comprises a monochromator incorporating said first optical surface and said first adjustable mirror.

12. The method of claim 1 wherein said input optical beam has a randomly and unpredictably variable input polarization state.

13. An optical system comprising:

an optical beam;

a first optical surface operable to intercept said optical beam;

a first adjustable mirror operable to intercept and redirect the location of said optical beam on said first optical surface; and a polarization interchanger operable to interchange the respective parallel (P) and perpendicular (S) plane polarization components of said optical beam relative to said first optical surface, thereby generating a polarization interchanged optical beam.

14. The system of claim 13 configured such that said optical beam propagates through said system in a first pass prior to said interchanging and in a second pass subsequent to said interchanging and is intercepted by said first optical surface in each of said first and second passes.

15. The system of claim 14 wherein said location on said first optical surface is determined relative to a location on said first optical surface intercepting said optical beam in said first pass.

16. The system of claim 14 wherein said polarization interchanger is disposed between said first pass and said second pass.

17. The system of claim 13 further comprising a second optical surface different from said first optical surface, configured such that said location on said first optical surface is determined relative to a location on said second optical surface.

18. The system of claim 13 wherein said first adjustable mirror is interconnected with a rotational drive selected from the group consisting of mechanical drives, flexures deformed using set screws, pin connections with springs and set screws, gear drives, electromechanical drives, motors, piezoelectric actuators, and hydraulic drives.

19. The system of claim 13 wherein the location of said optical beam on the surface of said first adjustable mirror is configured to remain substantially invariant during said redirecting.

20. The system of claim 13 wherein said first adjustable mirror is operable to redirect said location independently in two nominally orthogonal directions.

21. The system of claim 13 wherein said first optical surface is a surface of a diffraction grating having a dispersion direction and a non-dispersion direction substantially orthogonal to said dispersion direction.

22. The system of claim 13 where said optical beam has a randomly and unpredictably variable input polarization state.

* * * * *